March 30, 1926.
C. R. MARTINEAU
CHECK PROTECTING DEVICE
Filed May 6, 1925
1,578,289
2 Sheets-Sheet 1
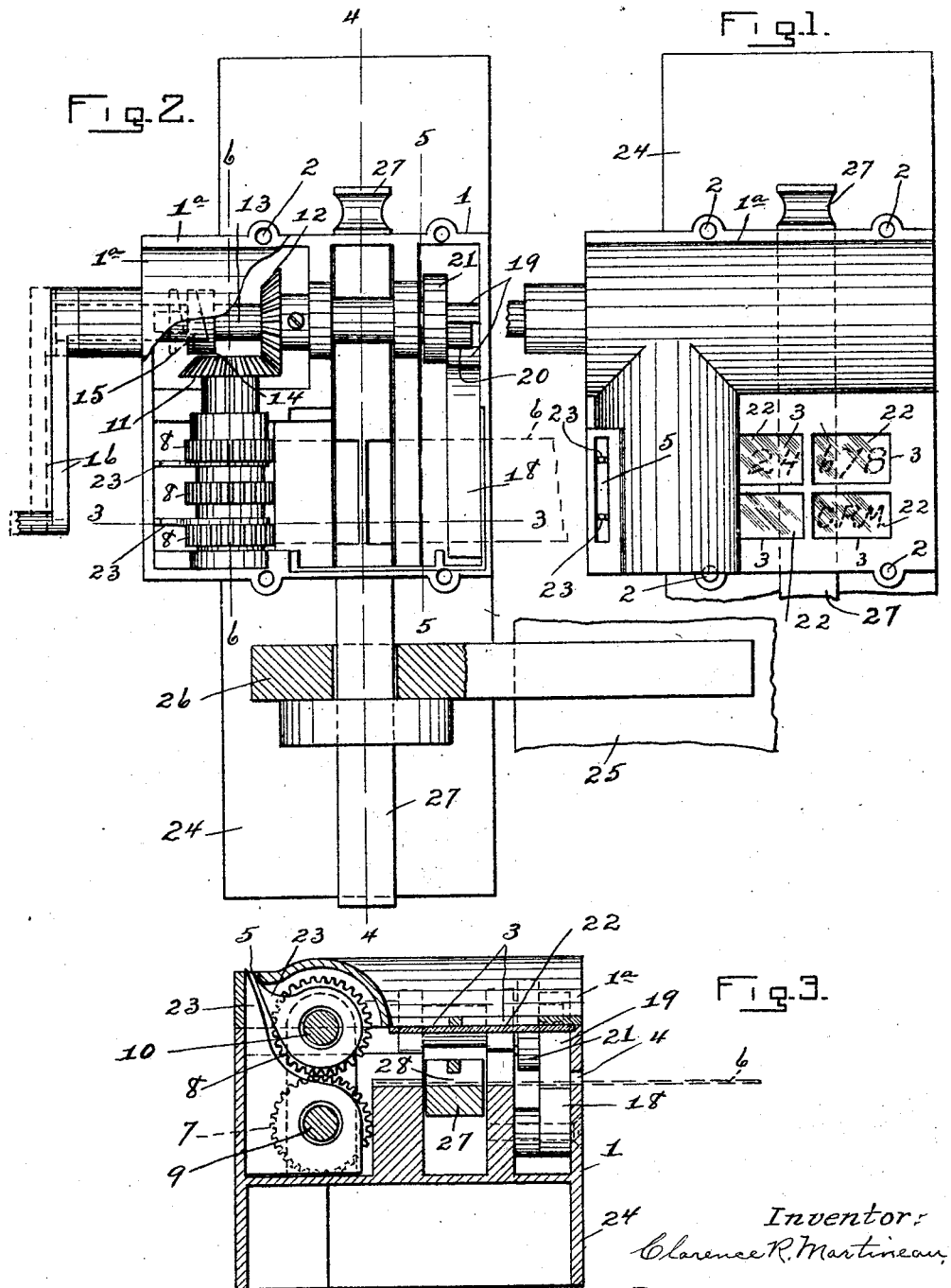
Inventor:
Clarence R. Martineau,
By Frank C. Curtis,
Attorney.

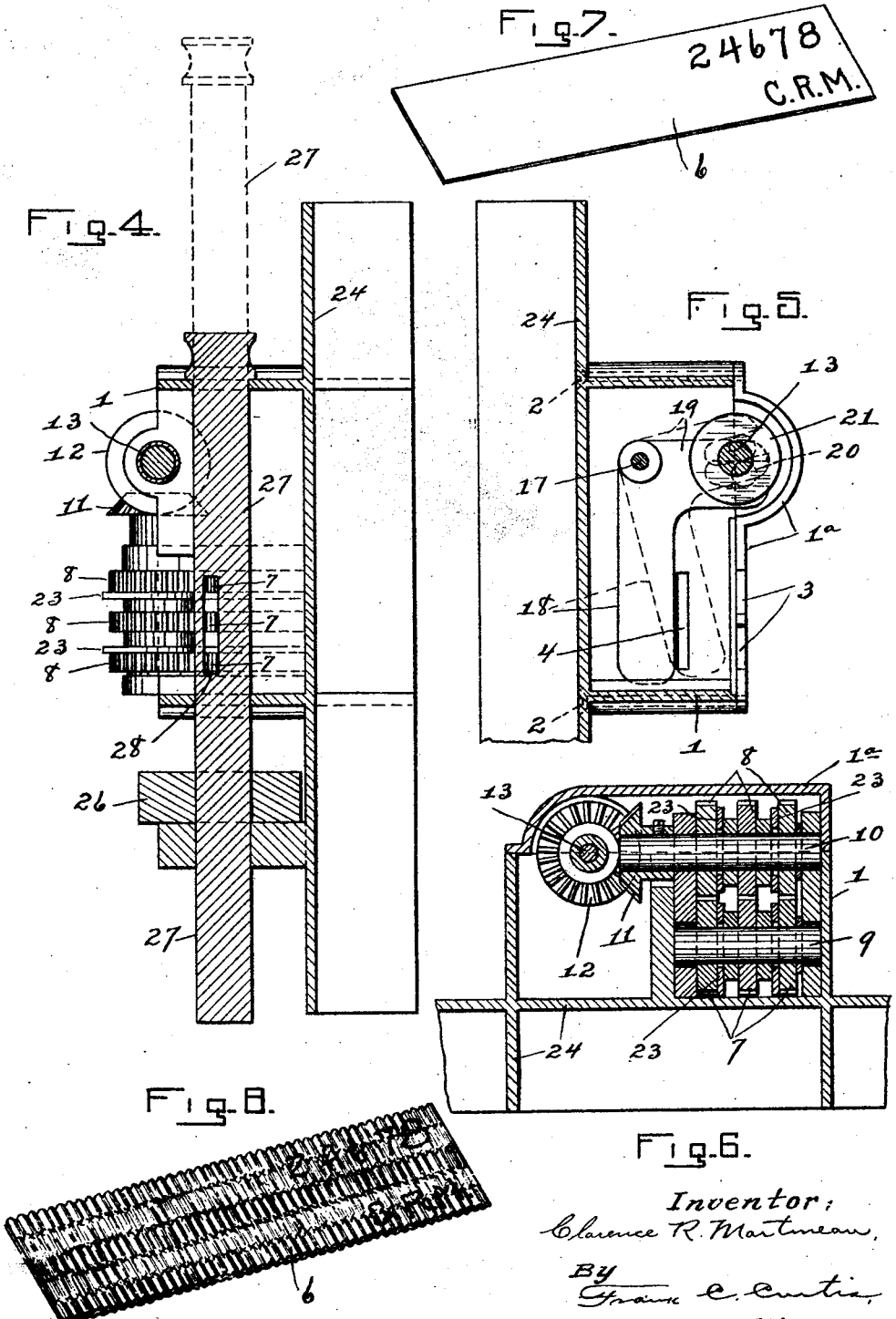

Patented Mar. 30, 1926.

1,578,289

UNITED STATES PATENT OFFICE.

CLARENCE R. MARTINEAU, OF ALBANY, NEW YORK.

CHECK-PROTECTING DEVICE.

Application filed May 6, 1925. Serial No. 28,330.

*To all whom it may concern:*

Be it known that I, CLARENCE R. MARTINEAU, a citizen of the United States, residing at Albany, in the county of Albany and State of New York, have invented new and useful Improvements in Check-Protecting Devices, of which the following is a specification.

Reference may be had to the accompanying drawings, and the reference characters marked thereon, which form a part of this specification. Similar characters refer to similar parts in the several figures therein.

The principal object of this invention is to render evident upon casual inspection the tampering with a check, seal, memorandum or the like.

Other objects will appear in connection with the following description.

Fig. 1 is a view in front elevation of my improved check-protecting device.

Fig. 2 is a similar view with the cover of the enclosure partly broken away.

Fig. 3 is a horizontal cross section of the same taken on the broken line 3—3 in Fig. 2.

Fig. 4 is a vertical cross section taken on the broken line 4—4 in Fig. 2.

Fig. 5 is a vertical cross section taken on the broken line 5—5 in Fig. 2.

Fig. 6 is a vertical cross section taken on the broken line 6—6 in Fig. 2.

Fig. 7 is a view in perspective of a check, seal or memorandum adapted to be protected by the mechanisms shown in Figs. 1 to 6 inclusive.

Fig. 8 is a similar view of the check after removal from the protecting mechanism.

Referring to the drawings wherein the invention is shown in preferred form, 1 is an enclosure having a cover, 1ª, secured to the body of the enclosure by screws, 2, the heads of which are concealed, or by other means whereby the cover cannot be readily removed.

The enclosure is provided with an inspection opening, 3, and with an inlet opening, 4, and an outlet opening, 5, at opposite ends of a path or passageway through the enclosure for a check, 6, whereby a check located in such passageway is subject to inspection through the opening, 3.

In said path of the check are rotatively mounted one or more pairs of toothed-wheels, 7 and 8, the members of each pair being on opposite sides of said path.

The toothed-wheel or wheels, 7, are mounted upon a shaft, 9, rotatory in bearings in the wall of the enclosure; and the toothed-wheel or wheels, 8, are mounted upon a shaft, 10, rotatory in bearings in the wall of the enclosure.

The toothed-wheels, 7 and 8, are so associated with one another that one of the pair serves to drive the other, particularly when a check, 6, is interposed between them; and when thus driven they serve both to feed the check between the wheels and to mutilate the check by engagement of the teeth of the wheels with the opposite sides of the check.

Fixed upon one of the shafts, 9, 10, as the shaft, 10, is a beveled gear, 11, in engagement with a beveled gear, 12, fixed upon a shaft, 13, at right angles to the shaft, 9, the shaft, 13, having fixed upon one of its ends within the enclosure, 1, one member, 14, of a clutch, the other member, 15, of which is formed upon the end of a crank, 16.

The clutch members, 14 and 15, have mutually engaging beveled toothed faces whereby the shaft, 13, can be rotated in one direction only by means of the crank, 16, and that in a direction to feed a check, 6, between and by means of the toothed-wheels, 7, 8, from the inlet opening, 4, toward the outlet opening, 5, of the enclosure.

By the term check or the like, I mean a strip of material bearing indicia identifying, or peculiar to, the particular check of a group or series of like checks; and such a check may be in the form of a seal, memorandum or other strip bearing the necessary information to adapt it for its intended purpose or use.

Suitable material for such a check is a strip of sheet metal such as tin, sheet brass or the like, and this may be provided with the desired indicia by printing, embossing, perforating or in any other known manner.

I have shown in Fig. 7, such a check bearing the identifying letters "C. R. M.", and the number "24678".

In using my improved protecting device for the protection of such a check, the check is inserted through the inlet opening, 4, of the enclosure, 1, opposite the inspection opening, 3, into engagement with the toothed wheels, 7 and 8, which are rotated by means of the crank, 16, to feed the check between said wheels toward the outlet opening, 5, until the check is drawn entirely within the enclosure and into such a position that the number 24678 and the letters C. R. M., are visible through the inspection opening, 3.

As the portion of the check or strip which has thus passed between the wheels, 7 and 8, is by the action of the teeth on said wheels mutilated and portions of the strip forced into the grooves between neighboring teeth on the respective wheels and as the wheels can be operated by the crank, 16, only in a direction to feed the strip toward the outlet opening, 5, it will be seen that the strip cannot be removed from the enclosure except by continuing the feeding movement between the toothed wheels until the entire strip has passed therebetween, and can be withdrawn through the outlet opening, 5.

A check or strip thus passed through and out of the enclosure will be mutilated by the teeth on the wheels, 7 and 8, to such an extent that it cannot again be used for its original purpose, and no similar unmutilated check can without detection be substituted within the enclosure for the check which has been thus mutilated unless bearing the same indicia.

If a similar check bearing different indicia be substituted for a check which has been removed in mutilated form from the enclosure, the substitution will be readily detected upon inspection and comparison of the indicia with a preserved record of the same.

To render futile any attempt to withdraw a substantial portion of the check or strip through the inlet opening, 4, I have mounted upon the enclosure wall through which the inlet opening, 4, is formed, an angle lever pivoted at 17, one arm, 18, of which is movable across the inlet opening, 4, and the other arm, 19, of which is in the form of a fork in engagement with a crank-pin, 20, carried by a crank disk, 21, fixed upon the shaft, 13.

The arrangement of the parts is such that as the rear end of the check or strip is drawn through the inlet opening, 4, and past the arm, 18, of the angle lever, said arm of the angle lever will be automatically moved across the inlet opening, 4, to close the same as indicated by dotted lines in Fig. 5.

The inspection opening, 3, is preferably closed by a body or plate, 22, of glass or other transparent material.

The forward end of the strip or check in passing through the enclosure may be directed toward the outlet opening, 5, by means of guide-fingers, 23, loosely mounted on the respective shafts, 9 and 10, between which guide-fingers the check or strip is drawn by the feed movement of the wheels, 7 and 8.

The device above described may be used if desired merely for the preservation or protection of a check or the like as above described.

In combination with the check, the device may be used to prevent the unauthorized release or removal of locking members of various kinds.

Illustrating such use, I have shown the enclosure, 1, mounted upon a member, 24, relatively to which a member, 25, is movable, separation of the two members being prevented by means of a hasp, 26, mounted upon the member, 25, which hasp is adapted to be engaged by a locking bolt, 27, slidably movable within the enclosure, 1, transversely of the path of the check or strip, 6, and provided with an opening, 28, adapted to receive the body of the check or strip, 6, when the bolt is in locking position.

In this use of the device, after the bolt has been slid into locking engagement with the hasp, 26, the check, 6, is inserted through the inlet opening, 4, of the enclosure and the opening, 28, in the bolt into feeding engagement with the toothed-wheels, 7 and 8, after which the check, 6, serves to lock the bolt, 27, against withdrawal of the hasp, 26, without destroying the check and as above explained the check cannot be removed without mutilation which destroys it for its original use.

After the bolt, 27, has been thus locked, an inspection through the opening, 3, will readily reveal the absence of a check, a check in broken condition, or substitution for the original check of a similar check bearing different indicia.

The mutilating mechanism may be of any known form adapted for destroying the identifying character of the original check, in substantially the manner and for the purpose above set forth.

I do not wish to be limited to the constructions shown and above described, as, for certain purposes of the invention, various changes may be made in the form and arrangement of various parts of the device within the scope of the claims without departing from the spirit of the invention.

What I claim as new and desire to secure by Letters Patent is—

1. In a device of the class described, and in combination, an enclosure provided with an inspection opening, and with an inlet passageway and an outlet passageway at opposite ends of a path for a check through the enclosure past said inspection opening; check-feeding and mutilating means operable in one direction only in said path of the check; and means within the enclosure automatically moved by the movement of the check-feeding mechanism to obstruct said inlet passageway.

2. In a device of the class described, and in combination, an enclosure provided with an inspection opening, and with an inlet passageway and an outlet passageway at opposite ends of a path for a check through the enclosure past said inspection opening; check-mutilating means in said path of the check; and locking mechanism including a movable member projecting interiorly of the enclosure and provided with an opening in the path of, and lockingly engageable with, the check.

3. In a device of the class described and in combination, an enclosure provided with an inspection opening closed by a transparent body, and with an inlet passageway and an outlet passageway at opposite ends of a path for a check through the enclosure past said inspection opening; check-mutilating means in said path of the check; and locking mechanism including a movable member projecting interiorly of the enclosure and provided with an opening in the path of, and lockingly engageable with, the check.

4. In a device of the class described and in combination, an enclosure provided with an inspection opening, and with an inlet passageway and an outlet passageway at opposite ends of a path for a check through the enclosure past said inspection opening; check-feeding and mutilating means operable in one direction only in said path of the check; and locking mechanism including a movable member lockably engaged within the enclosure by a check occupying said path.

5. In a device of the class described and in combination, an enclosure provided with an inspection opening, and with an inlet passageway and an outlet passageway at opposite ends of a path for a check through the enclosure past said inspection opening; check-feeding and mutilating means operable in one direction only in said path of the check; means within the enclosure automatically moved by the movement of the check-feeding mechanism to obstruct said inlet passageway; and locking mechanism including a movable member lockably engaged within the enclosure by a check occupying said path.

In testimony whereof, I have hereunto set my hand this 27th day of April, 1925.

CLARENCE R. MARTINEAU.